(12) United States Patent
Oel et al.

(10) Patent No.: US 10,503,747 B2
(45) Date of Patent: Dec. 10, 2019

(54) METHOD AND APPARATUS FOR OPERATING A USER INTERFACE

(71) Applicant: Volkswagen Aktiengesellschaft, Wolfsburg (DE)

(72) Inventors: Peter Oel, Bischofsheim (DE); Moritz Neugebauer, Berlin (DE); Michael Mischke, Hannover (DE); Christoph Waeller, Braunschweig (DE); Lorenz Bohrer, Munich (DE); Jens Ehrke, Isenbuettel (DE); Gordon Seitz, Ehra-Lessien (DE); Stefan Schulz, Berlin (DE); Imke Gaus, Berlin (DE); Oliver Meyer, Ingolstadt (DE)

(73) Assignee: Volkswagen AG, Wolfsburg (DE)

(*) Notice: Subject to any disclaimer, the term of this patent is extended or adjusted under 35 U.S.C. 154(b) by 297 days.

(21) Appl. No.: 15/280,145

(22) Filed: Sep. 29, 2016

(65) Prior Publication Data

US 2017/0017702 A1    Jan. 19, 2017

Related U.S. Application Data

(60) Division of application No. 13/668,676, filed on Nov. 5, 2012, and a continuation of application No. PCT/EP2011/001776, filed on Apr. 9, 2011.

(30) Foreign Application Priority Data

May 4, 2010    (DE) .......................... 10 2010 019 191

(51) Int. Cl.
*G06F 16/25*        (2019.01)
*G06F 16/24*        (2019.01)
(Continued)

(52) U.S. Cl.
CPC ......... *G06F 16/25* (2019.01); *G01C 21/3608* (2013.01); *G01C 21/3611* (2013.01);
(Continued)

(58) Field of Classification Search
CPC ..................................................... G06F 16/25
(Continued)

(56) References Cited

U.S. PATENT DOCUMENTS 6,397,212 B1    5/2002    Biffar
7,167,545 B2    1/2007    Plannerer et al.
(Continued)

FOREIGN PATENT DOCUMENTS

CN        1920946 A       2/2007
CN        101535768 A     9/2009
(Continued)

*Primary Examiner* — Syling Yen
(74) *Attorney, Agent, or Firm* — Muncy, Geissler, Olds & Lowe, P.C.

(57) ABSTRACT

A method and apparatus for operating a user interface is provided, in which a first user input is detected, and a confidence analysis is carried out. Different kinds of system responses are generated depending on the result of the confidence analysis, wherein a first kind of system response comprises a system output which requires a second user input, and a second kind of system response comprises the automatic selection of a database entry. A third kind of system response comprises the first and second features, wherein the third kind of system response automatically changes into the first or second kind of system response after the expiry of a period of time. In this case, one of the two first kinds can be set as a standard or "default," into which the automatic change then takes place after expiry of the period of time without further user interaction.

10 Claims, 3 Drawing Sheets

(51) Int. Cl.
*G01C 21/36* (2006.01)
*G10L 15/22* (2006.01)
*G06F 3/01* (2006.01)
*G06F 3/0488* (2013.01)
*G06F 3/16* (2006.01)

(52) U.S. Cl.
CPC ......... *G01C 21/3617* (2013.01); *G06F 3/016* (2013.01); *G06F 3/04883* (2013.01); *G06F 3/167* (2013.01); *G06F 16/24* (2019.01); *G10L 15/22* (2013.01)

(58) Field of Classification Search
USPC .............. 707/706, 713, 722, 736, 758, 781, 707/999.003–6
See application file for complete search history.

(56) References Cited

U.S. PATENT DOCUMENTS

| | | | |
|---|---|---|---|
| 7,343,551 B1 | 3/2008 | Bourdev | |
| 7,809,501 B2 | 10/2010 | Listle et al. | |
| 7,826,945 B2 | 11/2010 | Zhang et al. | |
| 8,364,709 B1* | 1/2013 | Das | G06F 16/90324 |
| | | | 707/780 |
| 8,930,350 B1* | 1/2015 | Herscovici | G06F 17/30864 |
| | | | 707/723 |
| 2002/0011949 A1 | 1/2002 | Rudow et al. | |
| 2005/0004917 A1 | 1/2005 | Ueda et al. | |
| 2006/0026170 A1 | 2/2006 | Kreitler et al. | |
| 2007/0005206 A1* | 1/2007 | Zhang | G06F 3/16 |
| | | | 701/36 |
| 2008/0155298 A1 | 6/2008 | Cina | |
| 2008/0189187 A1 | 8/2008 | Hao et al. | |
| 2009/0013255 A1 | 1/2009 | Yuschik et al. | |
| 2009/0210144 A1 | 8/2009 | Jungk et al. | |
| 2010/0076948 A1 | 3/2010 | Smithson et al. | |
| 2010/0125569 A1 | 5/2010 | Nair et al. | |
| 2011/0153564 A1* | 6/2011 | Cochinwala | G06F 17/30581 |
| | | | 707/624 |
| 2013/0124550 A1 | 5/2013 | Oel et al. | |

FOREIGN PATENT DOCUMENTS

| | | |
|---|---|---|
| DE | 199 29 425 A1 | 12/2000 |
| DE | 100 60 654 C1 | 6/2002 |
| DE | 103 13 222 A1 | 12/2003 |
| DE | 10 2006 051 331 A1 | 5/2008 |
| DE | 10 2008 008 948 A1 | 8/2009 |
| WO | WO 2011/137960 A1 | 11/2011 |

\* cited by examiner

METHOD AND APPARATUS FOR OPERATING A USER INTERFACE

This nonprovisional application is a divisional of U.S. application Ser. No. 13/668,676, which was filed on Nov. 5, 2012, which was a continuation of International Application No. PCT/EP2011/001776, which was filed on Apr. 9, 2011, and which claims priority to German Patent Application No. DE 10 2010 019 191.4, which was filed in Germany on May 4, 2010, and which are all herein incorporated by reference.

BACKGROUND OF THE INVENTION

Field of the Invention

The present invention relates to a method for operating a user interface, in which a first user input is detected, and a confidence analysis is carried out, during which the user input is compared with a plurality of stored database entries and each thus compared database entry is assigned a value of a confidence measure, which assesses the correspondence between the user input and this database entry. Different kinds of system responses which differ from one another in at least one feature are generated depending on the result of the confidence analysis, whereby a first kind of system response comprises, as a distinguishing first feature, a system output which requests a second user input, and a second kind of system response comprises, as a distinguishing second feature, the automatic selection of a database entry. The invention relates further to a corresponding apparatus, especially for carrying out this method, and to a vehicle having such an apparatus.

Description of the Background Art

Generic user interfaces have a broad range of applications for the operation of devices, particularly electronic equipment. Particularly, the comparison of user inputs with database entries stored in a database are known from the technical field of search engines, in which a user input is compared with database entries and the relevance of each database entry is calculated by means of an algorithm and an associated confidence measure is output, which quantifies the relevance. If such a search result is unambiguous, the corresponding database entry is output or a function is carried out on its basis. If the search result is not unambiguous, in this case either typically a hit list or a system-side query is output. In this regard, the user input and system output form a dialog-like scheme, particularly when a system output responding to a user input asks for another user input.

Such user interfaces are used in particular when it is assumed that detected data are faulty either because of incomplete or ambiguous inputs on the part of the user or because of system-side imprecise detection, as is the case, for example, in speech input in a noisy environment or in manual inputs in an environment affected by vibrations. For this reason, such interactive user interfaces are used increasingly in vehicles in order to improve the operating convenience of the numerous operating devices, such as, for example, a navigation system, telecommunication devices, or infotainment systems.

Further, it must be taken into account in the case of a vehicle that the driver is not distracted from the road traffic during an operating procedure via the user interface. It was proposed for this reason to make possible a multimodal user input, whereby one can switch among the possible input modalities to the one most advantageous for the user. Common input modalities include in particular inputs via speech, keyboard, touch screen, and non-contact gestures.

DE 10 2008 008 948 A1 describes, for example, such a method in which during a multi-part user input a switch can be made between two input modalities during the input as well.

DE 103 13 222 A1, which corresponds to U.S. Pat. No. 7,809,501, discloses a method for inputting place names in which ambiguous place names are shown in a graphic, for example, in the corresponding geographic positions on a map. The user then has the opportunity to make a rapid and unerring selection of the desired place name with the aid of this information.

DE 100 60 654 C1, which corresponds to U.S. Pat. No. 7,167,545, describes a method and a device for automatically issuing information by means of a search engine, in which the sought information, together with other associated attributes, are stored in the form of data records. A relevance check is performed with the stored database entries for a search argument input by the user for several attributes stored in a data record and via a weighting with confidence values the data record with the highest total confidence value is output. In the case of several data records with a nearly equal confidence value, the user is asked for further user input on the data record until the sought data record was clearly identified.

SUMMARY OF THE INVENTION

It is therefore an object of the present invention to provide a method and a corresponding apparatus for operating a user interface with system responses of a first and second kind with distinguishing first and second features of the aforementioned type, which have an improved dialog efficiency. In particular, the dialog duration and/or the number of user interactions are to be reduced.

In an embodiment, the method can include a third kind of system response having the first and second feature, i.e., the features of the first and second kind of system responses, whereby the third kind of system response automatically changes into the first or second kind of system response after the elapse of a period of time. System responses of a third kind with both features of the first and second kind have the advantage that in the case of an ambiguous result of the confidence analysis both action options of the first and second type can be provided to the user. In this case, one of the two kinds recognizable to the user can be set as the standard or "default" to which the automatic change then takes place after elapse of the period of time without further user interaction. The user can thus realize whether in the case of an in fact ambiguous or incomplete input on his part the system has recognized the desired input. This is advantageous, when a further user input, be it only a confirmation of the system-side suggestion, threatens to distract the user from another activity, for example, during driving of a vehicle.

The change in the system response can occur depending on the result of the confidence analysis. In particular, the result of the confidence analysis decides whether a change occurs from the third kind of system response to the first kind of system response or to the second kind of system response. Alternatively or also in addition, the result of the confidence analysis for regulating the length of the time period or for configuring the change between the two kinds of system response can be included. For example, a change could contain a warning message that the system-side selection based on the result of the confidence analysis may be incorrect. As a result, a rapid dialog flow can be weighed versus a reduced risk of a faulty activation of a function.

In an embodiment of the method of the invention, depending on the result of the confidence analysis, the activation of a function based on a selected database entry can occur immediately or after the elapse of a time period. The selection and activation of the function typically occurs based on the database entry with the highest confidence measure. For example, in the case of a sufficiently unambiguous result of the confidence analysis, the activation of a function occurs immediately, whereas in the case of a less unambiguous result thereby one waits for the elapse of the time period. In the first case, this has the advantage that the dialog flow is accelerated.

The time period after which the automatic change in the system response occurs without further user interaction is expediently dimensioned so that an interaction by the user is possible. The duration of the time period can be adjusted to the particular requirements and typically lies within the range of a few seconds to several, for example, 10 seconds.

Depending on the result of the confidence analysis, advantageously the request for a second user input comprises a representation of database entries whose number is limited and/or whose assigned values of the confidence measure are above a first threshold value. These so-called hit lists show the user alternative suggestions, which he can select quickly and conveniently from the indicated list, without having to make a complete new input.

In this case, the values of the confidence measure itself can also be shown or visualized. For example, the values of the confidence measure are presented as a percentage behind the associated database entry or, however, a database entry is highlighted in color depending on the value or a size proportional to the particular value is selected. The user can visually perceive and evaluate the result of the confidence analysis better in this way.

In an embodiment of the method of the invention, the database entries are assigned positions on a map and the database entries are represented graphically at the assigned position on the map. After the elapse of the time period, then an area around the database entry with the highest confidence measure is zoomed in automatically. This type of embodiment is especially advantageous for a navigation system in a vehicle.

In the case that the system-side selection of the database entry with the highest confidence measure does not correspond to the desired database entry that the user wanted to select by his user input, it is expedient to integrate a correction option into the method of the invention. Therefore, it can be provided according to the invention that in the case of the third kind of system response before the elapse of the time period, a second user input can occur on whose basis the activation of the function occurs. The second user input is in particular a selection of a shown database entry whose confidence measure has one of the next highest values. It is immaterial in this case whether the function was already activated on the basis of a previously wrongly selected database entry or this was provided for only after the elapse of the time interval. In the first case, the function execution based on the wrongly selected database entry is expediently terminated.

The result of the confidence analysis is the key condition for controlling the method of the invention. It is assumed in a confidence analysis that data detected on the system side, e.g., by incomplete or ambiguous entries or by imprecise detection are faulty, as is the case, for example, in speech input in a noisy environment or in manual inputs in an environment affected by vibrations. In particular, the result of the confidence analysis in this case can be unambiguous or less unambiguous. Within the meaning of the invention, there is an ideal unambiguous result of the confidence analysis, when precisely one database entry with a very high confidence measure is determined. A less unambiguous result is characterized by the fact that, for example, no or a plurality of database entries with a very high confidence measure are determined.

The confidence measure in this case can be calculated in a different way and, for example, expressed as a percentage, as is known, e.g., from the field of search engines. The calculation basis used in the specific case is not critical and can be adapted to the circumstances present. If the database entries concern individual words, a comparison could be made on a letter basis and the correspondence of the letters enter into the confidence measure as a percentage. Further, the confidence measure for frequently selected database entries could be increased, when an increased probability of a new selection can be assumed here.

The result of the confidence analysis according to the invention therefore typically comprises whether the highest value of the confidence measure exceeds a second threshold value. This second threshold value typically is very high close to a possible optimum (e.g., >90%). Alternatively or also in addition, the result also includes how many values of the confidence measure exceed this second threshold value. Alternatively or also in addition, it can be taken into account whether the difference between the highest and one of the next highest values of the confidence measure falls below a third threshold value. This third threshold value is typically small, particularly small compared with the second threshold value (e.g., <10%).

It can be provided in embodiments of the method of the invention that the type of graphic presentation depends on the result of the confidence analysis. For example, a hit list depending on the result can be shown the smaller the more unambiguous the result.

Alternatively or also in addition, depending on the results of the confidence analysis, a system response can comprise further features. For example, acoustic or haptic signals can be output to make the user aware multimodally of the specific result.

If a plurality of display surfaces or a very large display surface is available, depending on the result of the confidence analysis, the system output can occur on the different display surfaces or at different positions on a display surface. If based on the confidence analysis with high probability a correctly selected database entry is to be assumed, a hit list can be shown at a less prominent position on the display surface or on a secondary display surface, which is advantageous particularly when a function was already activated in parallel, which requires a major part of the display surface itself. As a result, the risk of distraction for the user is reduced, particularly when it is assumed that the user would not like to see another selection or would not like to enter a correction.

The apparatus of the invention for operating a user interface comprises means for detecting user inputs, an interface to a functional device in which database entries are stored, and a display surface for the visual presentation of system outputs. It comprises further a control unit for carrying out a confidence analysis, whereby comparisons can be made between user inputs and a plurality of stored database entries and each of the compared database entries can be assigned a value of a confidence measure, which assesses the correspondence of the user input to this database entry. Different system responses which differ from one another in at least one feature can be generated by the control unit depending on the result of the confidence analysis, whereby a first kind of system response comprises, as a distinguishing first feature, a system output which requests a second user input, and a second kind of system response comprises, as a distinguishing second feature, the automatic selection of a database entry. In this case, the control unit can generate a third kind of system response which comprises the first and second feature, whereby the third kind of system response automatically changes into the first or second kind of system response after the elapse of a period of time. The apparatus is particularly suitable for carrying out the method of the invention. Thus, it also has the advantages of the method of the invention.

According to an embodiment of the invention, a vehicle is equipped with such an apparatus for operating a user interface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The exemplary embodiment described below relates to the use of the apparatus and of the method in a vehicle, particularly a motor vehicle. A user interface in the vehicle can be provided to the vehicle passengers by way of the method and the apparatus. It is pointed out, however, that the apparatus and the method can be used in the same way in other devices as well, such as, for example, portable devices.

Figure 1:
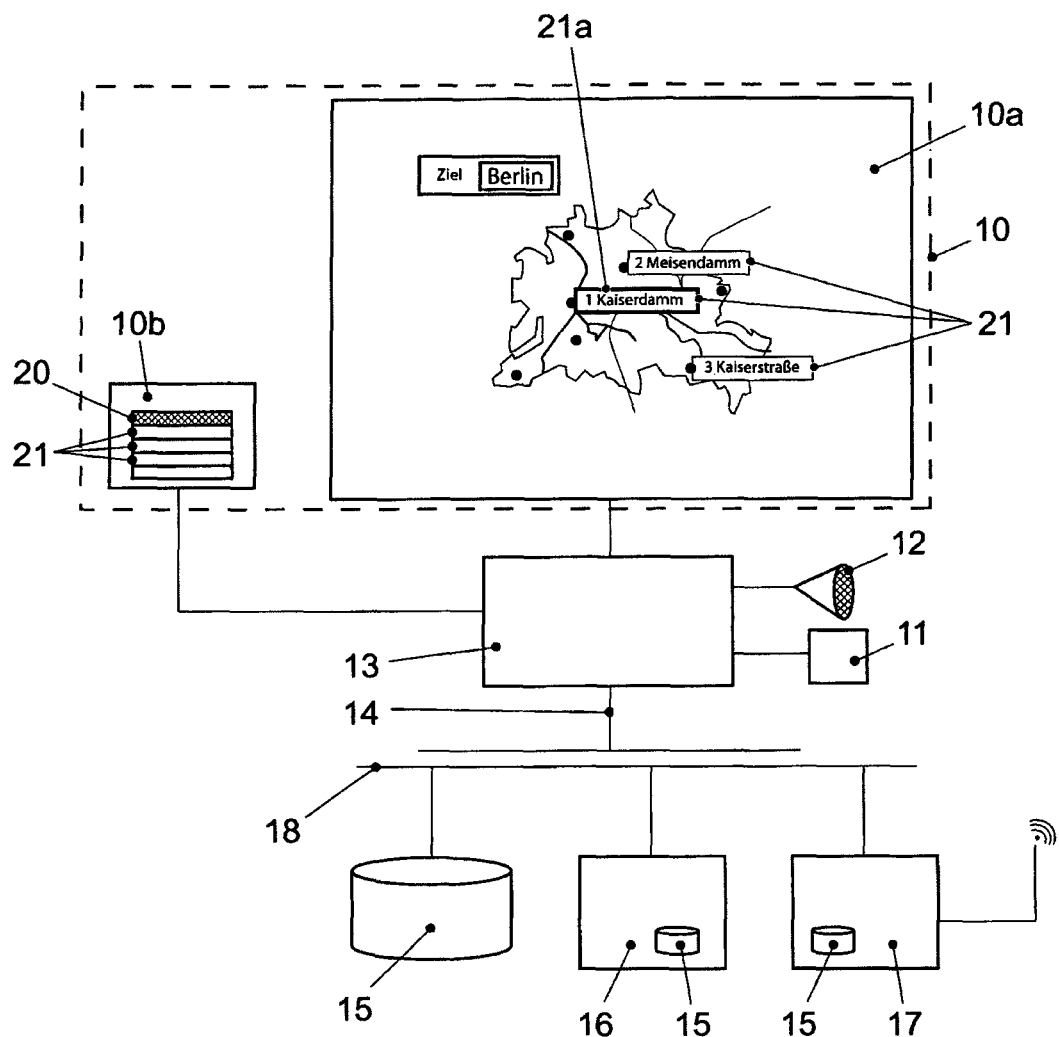
FIG. 1 shows schematically the structure of an exemplary embodiment of the apparatus of the invention for operating a user interface.

The structure of an exemplary embodiment of the apparatus of the invention for operating a user interface is illustrated schematically in FIG. 1. A display surface 10 in a vehicle is connected via a control unit 13 to means 11 for the manual input and means 12 for speech input. Control unit 13 is connected via an interface 14 to data bus 18 in the vehicle, by way of which the control unit has access to a database 15. Database 15 in this case can be a comprehensive database in which all data accumulating in the vehicle for the diverse functional devices can be retrieved. Each functional device comprises in addition a separate database 15 in which the data specific to the functional device are stored. The functional devices are, for example, a permanently installed navigation system 16 or also one that can be removed from the vehicle and a functional system 17 with a wireless interface, e.g., a cellular telephone.

The means 12 for speech input comprise a microphone for receiving acoustic signals, a software module for voice activity detection, and an adaptive filter for noise cancellation. The voice activity detection and the adaptive filter alternatively can also be localized in other hardware and be interconnected, for example, via control unit 13 to the means 12 for speech input. The means 11 for the manual input can be configured as a keyboard or manual operating elements, e.g., rotating push button. Display surface 10 may have totally or in areas a touch-sensitive surface, so that manual inputs can be made also via the display surface. For example, a keyboard can be displayed on a section of display surface 10 and manual input can occur by touching of a displayed key.

Different information can be displayed graphically on display surface 10. In particular, the information concerns database entries 21 which are stored in one of the databases 15 and are displayed according to the method of the invention, described further in detail below, on a geographic map or also in the form of a hit list 20. In the shown exemplary embodiment, display surface 10 is divided into a primary display surface 10a, which is configured as a large display, and into a secondary display surface 10b. Display surfaces 10a and 10b in this case can be separated physically and spatially from one another. In particular, the primary display surface 10a extends over wide parts of the cockpit in the vehicle, so that, for example, it extends substantially over the entire width of the vehicle or is projected onto the windshield as a so-called head-up display.

Control unit 13 is configured to carry out the method of the invention. It comprises a processor for running a program to perform a confidence analysis and for controlling system responses and a data memory for storing the results.

The method of the invention will now be explained in greater detail with the use of exemplary embodiments with reference to FIGS. 2-4. Whereas in this case illustrations of the system responses are described with reference to FIGS. 2a to 2c and 3, the confidence analysis will be discussed in greater detail with reference to FIGS. 4a and 4b. The result of the confidence analysis can be assigned basically in the most diverse way to different representations of the system responses, without being limited to the assignments described below.

Figure 2A:
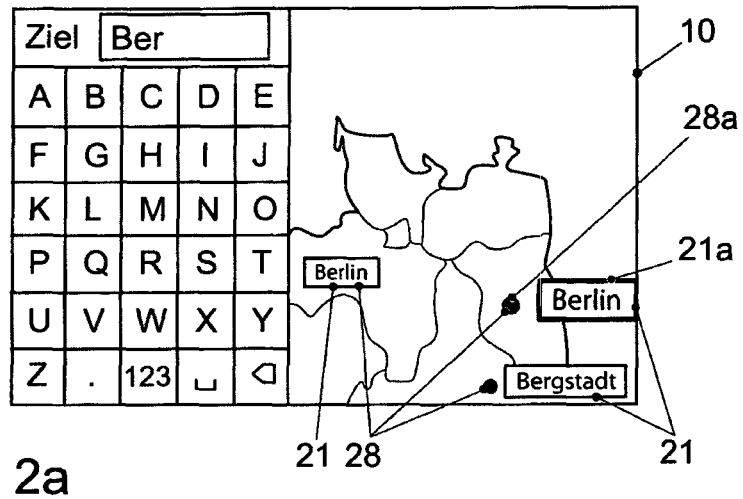
FIGS. 2a-2c show graphic illustrations of database entries, which were generated according to an exemplary embodiment of the method of the invention.
Figure 2B:
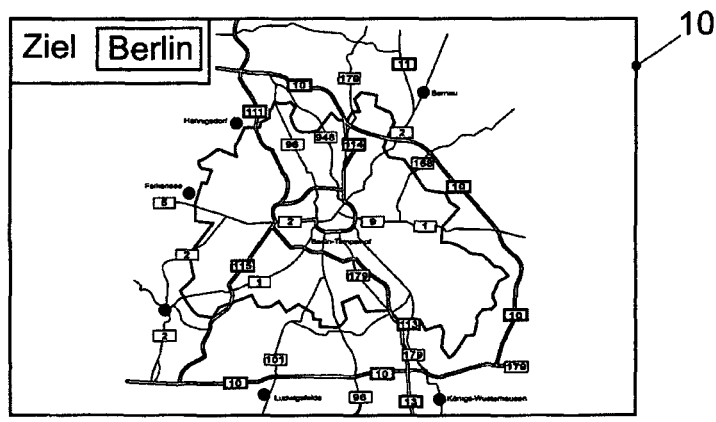
Figure 2C:
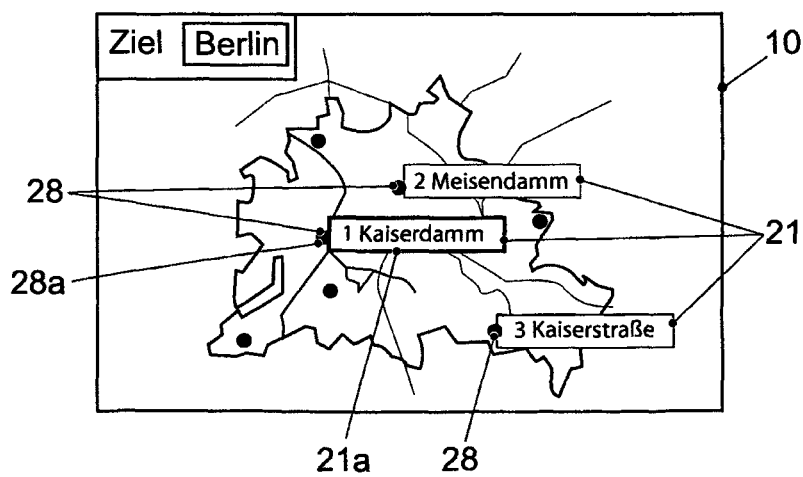

Graphic representations with visualizations of database entries, which were generated according to an exemplary embodiment of the method of the invention, are shown in FIGS. 2a to 2c. The graphic contents of a navigation system 17 are output on display surface 10 configured as a touch screen in a vehicle. The user, for example, the driver of the vehicle, would like to input "Berlin" as a new destination address. To this end, he is shown a keyboard on display surface 10, which he can operate conveniently by simple touching display surface 10. If he must interrupt his user input, e.g., because of some other necessary process for driving the vehicle, the system performs a comparison on the basis of this possibly incomplete entry with all database entries 21 in the navigation system and assesses each possible hit with a confidence measure 22.

Alternatively, the user input could also have occurred using speech. Here, the results could have been especially ambiguous, because a high background noise level prevails in the vehicle or the user does not speak clearly. The database comparison could be made in a similar way. In particular, the user input can have several parts in that, for example, street and place names are input or the individual parts of the user input occur multimodally, e.g., manually and via speech, as is described in the previously cited DE 10 2008 008 948 A1.

In the confidence analysis, in particular the input letters "Ber," for example, are compared with available database entries 21. In addition, for example, it can be considered which destinations were recently driven to, what the current position of the vehicle is, or whether other attributes of the user input are known, for example, when a street name was specified in a previous search or in a multi-part input.

In the exemplary embodiment, several possible hits are found whose determined values of the confidence measure 22 are high. Positions 28 on the map are assigned to the corresponding database entries 21 and graphically represented at positions 28. Database entry 21a with the highest confidence measure 22 is selected. On the system side, now further user input is awaited either in form of a confirmation of selected database entry 21a or in the form of a correction input.

If the user realizes that the selected database entry 21a is not the desired destination, he can input a suitable correction, in particular select one of the other displayed database entries 21 by touching the particular position 28 on the touch screen. If after the elapse of a time period, no further user input occurs, an area around position 28a of the already selected database entry 21a is zoomed in automatically, as shown in FIG. 2b. In this regard, the time period can be selected the shorter, the more unambiguous the result of the confidence analysis, particularly when as in the shown example only three possible results were identified.

It is shown in FIG. 2c how after the zooming in on an area around the desired city the multi-part user input is compared once more with database entries 21 and now to identify the desired street again three possible hits are shown on the map at the assigned positions 28. Here as well, a database entry 21a is again selected and after the elapse of a time period without user input an area around position 28a around the selected database entry 21a would be zoomed in automatically (not shown).

Figure 3:
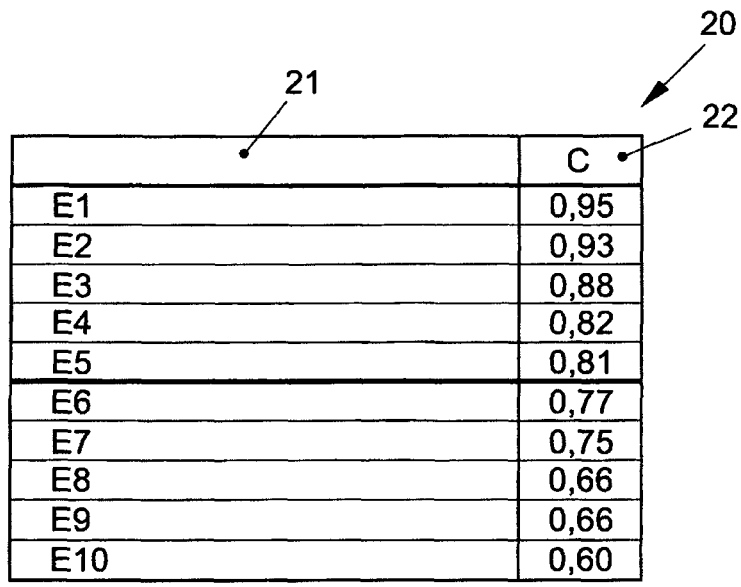
FIG. 3 shows schematically the structure of a hit list, which was generated according to an exemplary embodiment of the method of the invention.

The schematic structure of a hit list 20, which was generated according to another exemplary embodiment of the method of the invention, is shown in FIG. 3. Hit list 20 comprises two columns, in which relevant database entries 21 are listed in the left column and the associated calculated values of confidence measure 22 are compared in the right column. Database entries 21 are sorted in decreasing order of the assigned confidence measure 22. The confidence measure in the exemplary embodiment has values between $0 \leq C \leq 1$. A first threshold value is set to $C=0.8$, whereby in the displaying of a hit list only database entries with a confidence measure above this first threshold value are indicated. In addition, the display of database entries can be limited to a fixed number, for example, to 10 hits, to assure a clear display and not to overtax the user, particularly the driver of the vehicle, visually.

Figure 4A:
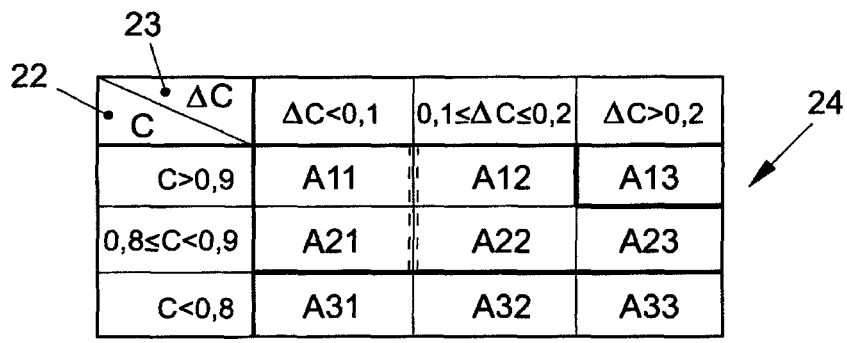
FIGS. 4a-4b show schematically the assignment of the kinds of system responses depending on the result of the confidence analysis according to an exemplary embodiment of the method of the invention.
Figure 4B:
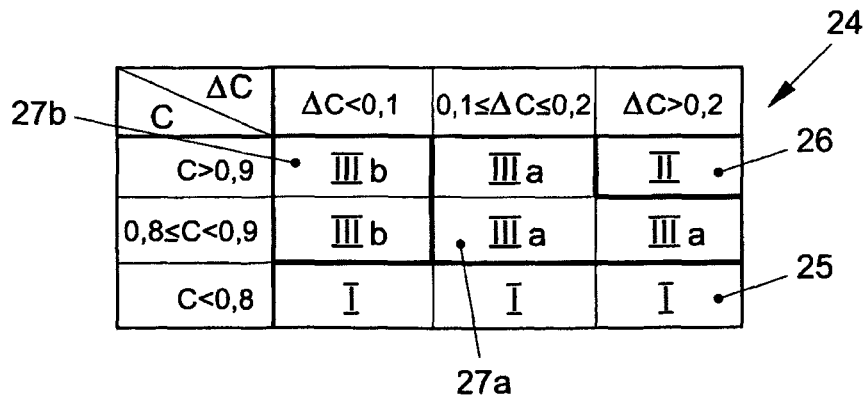

The assignment of the kinds of system responses depending on the result of the confidence analysis according to an exemplary embodiment of the method of the invention is shown schematically in FIGS. 4a and 4b. The result of the confidence analysis is categorized in a results table 24 as a 3×3 matrix, in that two criteria are tested for exceeding or falling below two threshold values. The first criterion is the testing whether the highest occurring value C of confidence measure 22 exceeds the second threshold values $C=0.8$ and $C=0.9$. The second criterion is the testing whether the value $\Delta C$ of the difference 23 between the highest and second highest value C of the confidence measure 22 falls below the third threshold value $\Delta C=0.1$ and $\Delta C=0.2$.

The result of the confidence analysis is the more unambiguous, the further right and further to the top the result is in results table 24. Thus, in matrix field A13 the confidence measure of the most relevant database entry is high (>0.9) and the distance to the next database entry is also high (>0.2). Accordingly, the result in matrix fields A31-A33 is ambiguous.

It is therefore sensible to assign the ambiguous search results represented by matrix fields A31-A33 to a system response of the first kind I, defined by the value range 25, which asks for a second user input. It cannot be assumed in this case based on the first user input that the desired database entry can be accurately recognized and selected system-side. To avoid false activations, a second user input in the dialog flow can therefore lead to the desired result more rapidly. In particular, the second user input can be supported and accelerated in that database entries 21 with the highest values of confidence measure 22, as described, for example, in FIG. 3, are shown, which increases the recognition and the convenience during the second user input, e.g., a selection by touching the touch-sensitive display surface 10.

Similarly, an unambiguous search result, represented by the matrix field A13, can be assigned to a system response of the second kind II, defined by the value range 26. Based on the first user input it can be assumed that the desired database entry can be recognized accurately and selected system-side. To avoid unnecessary further system-side queries to the user, therefore immediately based on the selected database entry 21 a function can be carried out, which accelerates the dialog flow and rapidly leads to the desired result.

The other matrix fields are assigned to a system response of the third kind III, defined by the value range 27. In this case, both a selection of database entry 21 with the highest confidence measure 22 occurs and also a system-side request for a second user input. In this case, as in the shown example, the system response of the third kind III can be divided into several value ranges 27a and 27b. The result for the confidence analysis is more unambiguous for value range 27a than for value range 27b. It is provided therefore for value range 27a to generate a system response of the kind IIIa, in which based on the selected database entry 21a a function is carried out immediately, whereas for value range 27b a system response of the kind IIIb is generated, in which the function is carried out only after the elapse of a time period. In both cases, a hit list 20, for example, according to FIG. 3, can be displayed as support to accelerate a possible second user input as a correction for a wrongly selected database entry 21a. After the elapse of a time period, hit list 20 is again hidden.

The method of the invention can be designed in a very different way to be adapted to the particular circumstances. The adaptations relate particularly to the input and output modalities, the assignment to the kind of system responses depending on the confidence analysis, and the specific design of the presentation. They can be preset in this case and optimized for the application or also be configurable by the user himself.

The input and output modalities for the user input and the system output can be adapted ergonomically to the particular application. In particular for operation in a vehicle, user input via speech is suitable in the method of the invention, whereby, however, particularly multimodal inputs with inclusion of gestures and via manual operating elements are advantageous. Voice interfaces are less suitable in so-called quiet zones in which the noise level is to be kept low, or for users with hearing or speech disorders. In this case, the method of the invention can be used furthermore in that manual user inputs are provided. Likewise, a system output can be adapted multimodally to the circumstances.

The classifying of the system responses can occur in many ways. Thus, more than two criteria can be considered for the result of the confidence analysis and thereby many threshold values per criterion can be defined. In this way the system can respond in an even more differentiated manner to a user input and thereby optimize the performance and reaction time. Particularly the time period after which a change in a system response of the third kind becomes a system response of the first or second kind can be calculated from the highest value or the highest values of the confidence measure or sums and differences thereof. These values can be adjusted particularly to the application program for which the user interface is provided.

A function execution can be activated more rapidly for application programs with very long response times than in application programs with very short response times. If, for example, the method of the invention is used to search for a contact person who is stored in a cellular telephone and to whom a call over the cell phone is to be made, this can perhaps require some time in a vehicle at a rather high speed, because the cell phone must first reserve transmission resources in the local wireless cell and second the other party, optionally also a cell phone, must first be localized by the network and the connection must be made there. In this case, the connection could be set up in advance, also when the result of the confidence analysis was not very unambiguous. If the wrong party was selected, the attempted call can always still be terminated in time by the correction option and another telephone number selected.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a user interface, comprising:
   detecting a first user input;
   performing a confidence analysis, during which the first user input is compared with a plurality of stored database entries and each compared database entry is assigned a value of a confidence measure, which assesses a correspondence between the first user input and a database entry; and
   generating different kinds of system responses, which differ from one another in at least one feature, depending on a result of the confidence analysis, the system responses comprising:
   a first kind of system response comprising, as a distinguishing first feature, a system output which requests a second user input;
   a second kind of system response comprising, as a distinguishing second feature, an automatic selection of the database entry; and
   a third kind of system response comprising the distinguishing first feature and the distinguishing second feature,
   wherein the third kind of system response automatically changes into the first kind of system response or the second kind of system response after a period of time has elapsed,
   wherein with a sufficiently unambiguous result of the confidence analysis, a function on the basis of a selected database entry of the first input is immediately activated, whereas with a less unambiguous result of the confidence analysis, the function on the basis of the selected database entry of the first input is activated after a further period of time has elapsed, and
   wherein the result of the confidence analysis is based on categorized values of a matrix table associated with two threshold values.

2. The method according to claim 1, wherein the first kind of system response is generated based on database entries with assigned values of the confidence measure above a first threshold value of the two threshold values.

3. The method according to claim 1, wherein the database entries are assigned positions on a map.

4. The method according to claim 1, wherein an area around the selected database entry is zoomed in automatically.

5. The method according to claim 1, wherein the result of the confidence analysis comprises whether a highest value of the value of the confidence measure exceeds a first threshold value of the two threshold values.

6. The method according to claim 1, wherein the system output occurs on different display surfaces or at different positions on a display surface based on a result of the confidence analysis.

7. The method according to claim 1, wherein the plurality of system responses further comprises an acoustic signal or a haptic signal.

8. The method according to claim 1, wherein the function is activated when the second user input occurs before the period of time has elapsed during the third type of system response.

9. The method according to claim 1, wherein the categorized values of the matrix table are determined by testing two criteria for exceeding or falling below the two threshold values.

10. The method according to claim 1, further comprising assigning the system responses according to ranges of the categorized values of the matrix table.

* * * * *